(12) United States Patent
Feuerstack et al.

(10) Patent No.: US 9,088,240 B2
(45) Date of Patent: Jul. 21, 2015

(54) ENERGY STORAGE DEVICE FOR A SEPARATELY EXCITED ELECTRICAL MACHINE

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 13/984,085

(22) PCT Filed: Dec. 7, 2011

(86) PCT No.: PCT/EP2011/072049
§ 371 (c)(1),
(2), (4) Date: Aug. 7, 2013

(87) PCT Pub. No.: WO2012/107127
PCT Pub. Date: Aug. 16, 2012

(65) Prior Publication Data
US 2013/0314008 A1    Nov. 28, 2013

(30) Foreign Application Priority Data
Feb. 8, 2011    (DE) .................. 10 2011 003 759

(51) Int. Cl.
*H02P 1/00*    (2006.01)
*H02P 29/00*    (2006.01)
*H02J 7/00*    (2006.01)
(Continued)

(52) U.S. Cl.
CPC .............. *H02P 29/00* (2013.01); *H02J 7/0024* (2013.01); *H02J 7/0065* (2013.01); *H02J 7/1492* (2013.01); *H02P 7/298* (2013.01); *H02P 25/021* (2013.01);
(Continued)

(58) Field of Classification Search
CPC ............ Y02T 10/7005; Y02T 10/7061; Y02T 10/10766; H02J 7/0024
USPC ......................................................... 318/139
See application file for complete search history.

(56) References Cited

U.S. PATENT DOCUMENTS 4,348,629 A * 9/1982 Sievers ........................... 322/99
4,379,990 A * 4/1983 Sievers et al. ................... 322/99
(Continued)

FOREIGN PATENT DOCUMENTS

| DE | 102010027857 | 10/2011 |
|---|---|---|
| DE | 102010027861 | 10/2011 |
| EP | 0515343 | 11/1992 |
| EP | 0907238 | 4/1999 |

OTHER PUBLICATIONS

International Search Report for Application No. PCT/EP2011/072049 dated Jul. 3, 2012 (2 pages).

*Primary Examiner* — Erick Glass
(74) *Attorney, Agent, or Firm* — Michael Best & Friedrich LLP

(57) ABSTRACT

The invention relates to an energy storage device (2) comprising at least one first energy supply branch (2a, 2b, 2c) which is designed to supply a separately excited electrical machine (1) with energy via a first connection (3a, 3b, 3c), and a second energy supply branch (2d) which is connected in parallel to the at least one first energy supply branch (2a, 2b, 2c) and which is designed to supply a field winding (11) of the separately excited electrical machine (1) with current via a second connection (3d), the at least one first energy supply branch (2a, 2b, 2c) and the second energy supply branch (2d) being connected to the field winding (11) by means of third connections (4a, 4b, 4c; 4d) via a common reference bus (9).

10 Claims, 3 Drawing Sheets

(51) Int. Cl.
  *H02J 7/14*    (2006.01)
  *H02P 7/298*   (2006.01)
  *H02P 25/02*   (2006.01)

(52) U.S. Cl.
  CPC .. *H02J 2007/0059* (2013.01); *H02J 2007/0067* (2013.01); *Y02T 10/7005* (2013.01); *Y02T 10/92* (2013.01)

(56) References Cited

U.S. PATENT DOCUMENTS

| | | | | |
|---|---|---|---|---|
| 6,058,032 | A * | 5/2000 | Yamanaka et al. | 363/71 |
| 6,236,580 | B1 * | 5/2001 | Aiello et al. | 363/37 |
| 2011/0006710 | A1 * | 1/2011 | Kondo et al. | 318/400.03 |
| 2013/0197821 | A1 * | 8/2013 | Maeda et al. | 702/34 |

* cited by examiner

ENERGY STORAGE DEVICE FOR A SEPARATELY EXCITED ELECTRICAL MACHINE

BACKGROUND OF THE INVENTION

The invention relates to an energy storage device for a separately excited electrical machine and a system having a separately excited electrical machine that is controlled and supplied with electrical energy with the aid of a controllable first energy storage device.

It has become apparent that in future both in the case of stationary applications, for example wind turbines, and also in vehicles, for example hybrid vehicles or electric vehicles, electronic systems are being used ever more frequently, which electronic systems combine new energy storage technologies with electrical drive technology. In conventional applications, for example as illustrated in FIG. 1, an electrical machine 101, which is embodied for example as a three-phrase machine, is controlled by way of a converter in the form of a pulse converter 102. A characterizing feature of systems of this type is a so-called DC voltage intermediate circuit 103, by means of which an energy storage device 104, generally a traction battery, is connected to the DC voltage side of the pulse converter 102. In order to be able to fulfill the particular requirements relating to power and energy for a particular application, a plurality of battery cells 105 are connected in series. Since it is necessary for the current that is provided by an energy storage device 104 of this type to flow through all the battery cells 105 and a battery cell 105 can only carry a limited amount of current, battery cells are often in addition connected in parallel in order to increase the maximum current.

When connecting a plurality of cells in series, the problem arises in addition to a high total voltage that the entire energy storage device fails if a single battery cell fails because it is then no longer possible for the current to flow through the battery. A failure of this type of the energy storage device can cause the entire system to fail. In the case of a vehicle, a failure of the drive battery causes the vehicle "to be immobilized". In other applications, for example in the case of the rotor blade adjustment in wind turbines, situations that pose a safety risk can even occur in unfavorable boundary conditions, for example when the wind is too strong. Efforts are therefore continuously being made to achieve a high level of reliability of the energy storage device, wherein the term "reliability" describes the ability of a system to function in a fault-free manner for a predetermined period of time.

The earlier applications DE 102010027857.2 and DE 102010027861.0 describe batteries having a plurality of battery module strings that can be connected directly to an electrical machine. The battery module strings comprise a plurality of series-connected battery modules, wherein each battery module comprises at least one battery cell and an allocated controllable coupling unit that renders is possible to interrupt the respective battery module string in response to control signals or to bridge the respective allocated at least one battery cell or to connect the respective allocated at least one battery cell to the respective battery module string. Appropriate phase signals for controlling the electrical machine can also be provided by appropriately controlling the coupling units, for example with the aid of pulse width modulation, so that it is possible to forego a separate pulse converter. In other words, the pulse converter that is required to control the electrical machine is consequently integrated into the battery.

For the purpose of disclosure, the scope of each of these two earlier applications is incorporated in full into the present application.

In contrast to conventional systems, there is no constant DC voltage available at the output of the battery system, which constant DC voltage can be used for example to supply an exciter winding of a separately excited electrical machine.

SUMMARY OF THE INVENTION

The present invention provides in accordance with an embodiment an energy storage device having at least a first energy supply branch that is embodied for the purpose of supplying a separately excited electrical machine with energy by way of a first connection, and a second energy supply branch that is connected in parallel to the at least one first energy supply branch and is embodied for the purpose of supplying current to an exciter winding of the separately excited electrical machine by way of a second connection, wherein the at least one first energy supply branch and the second energy supply branch are connected by way in each case of a third connection to the exciter winding.

Furthermore, the present invention provides in accordance with a further embodiment a system having a separately excited electrical machine and a controllable energy storage device. The controllable energy storage device comprises at least a first energy supply branch that is connected by way of a first connection to an energy supply connection of the separately excited electrical machine, and a second energy supply branch that is connected in parallel to the at least one first energy supply branch and is connected by way of a second connection to an exciter winding of the separately excited electrical machine. The at least one first energy supply branch and the second energy supply branch are connected by way in each case of a third connection to a common reference rail that is connected to the exciter winding of the separately excited electrical machine.

An idea of the present invention is to supply an exciter winding of a separately excited electrical machine with the aid of a separate energy supply string in a controllable energy storage device. The separate energy supply string can be adapted to suit the corresponding supply purpose. By reducing the requirement for power to supply the exciter winding, the separate energy supply string can be equipped with fewer and/or smaller energy supply modules, so that the installation space required reduces. In addition, in contrast to other energy supply branches, the separate energy supply string can be equipped with coupling units of different connecting topologies, as a consequence of which power losses can be minimized.

In accordance with an advantageous embodiment, an energy storage device in accordance with the invention comprises in the at least one first energy supply branch and the second energy supply branch in each case at least two series-connected energy storage modules that comprise in each case at least one electric energy storage cell having an allocated controllable coupling unit.

In an advantageous manner, the coupling units of the energy storage modules of the at least one first energy supply branch can comprise switch elements in a full-bridge arrangement, and the coupling units of the energy storage modules of the second energy supply branch can comprise switch elements in a half-bridge arrangement. In this exemplary embodiment, the energy storage device in accordance with the invention can be embodied for the purpose of supplying an n-phase synchronous AC machine with energy.

Alternatively the coupling units of the energy storage modules of the at least one first energy supply branch can comprise switch elements in a half-bridge arrangement and the coupling units of the energy storage modules of the second energy supply branch can comprise switch elements in a full-bridge arrangement. In this exemplary embodiment, the energy storage device in accordance with the invention can be embodied for the purpose of supplying a separately excited DC machine with energy.

It can be preferably provided to mutually connect the respective third connections by way of a common reference rail. This advantageously reduces the number of connections to the energy storage device.

BRIEF DESCRIPTION OF THE DRAWINGS

Further features and advantages of the embodiments of the invention are evident in the description hereinunder with reference to the attached drawings.

In which.

DETAILED DESCRIPTION

Figure 1:
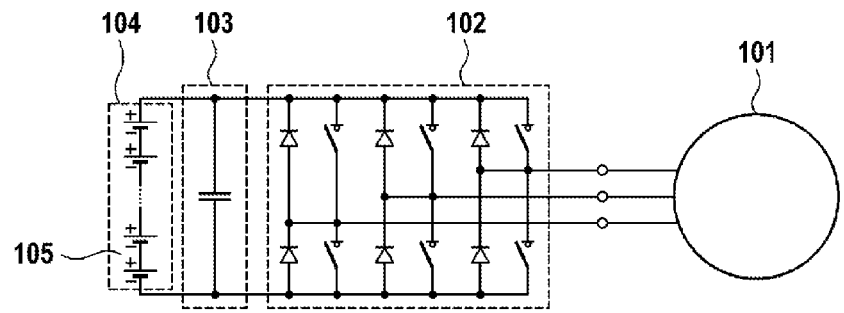
FIG. 1 shows a schematic illustration of a system having an electrical machine known in the prior art.
Figure 2:
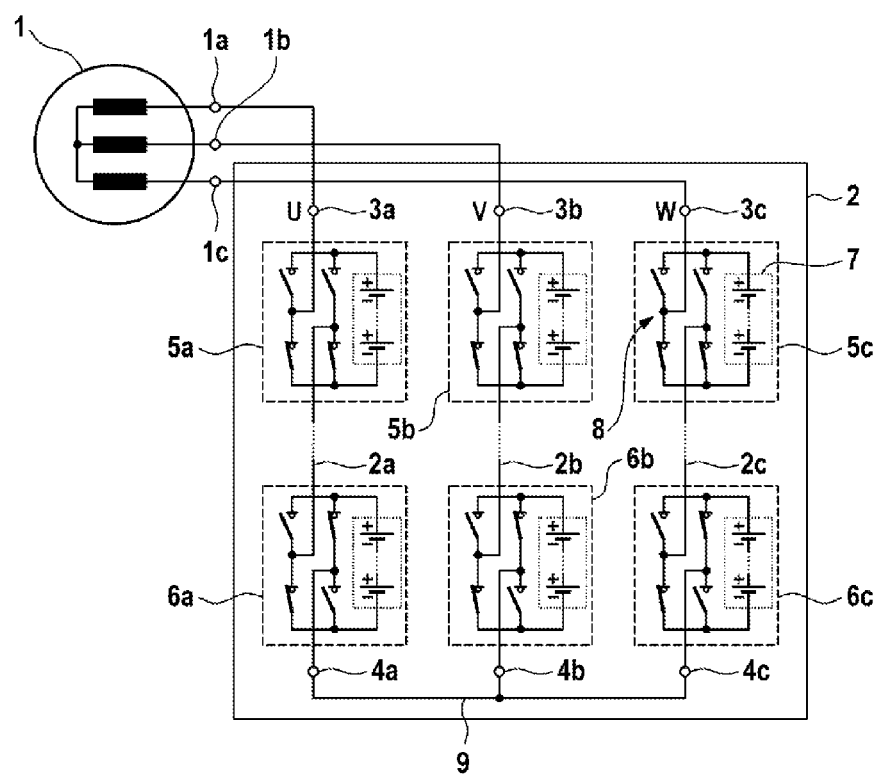
FIG. 2 shows a schematic illustration of a system having an electrical machine and a controllable energy storage device.

FIG. 2 shows a system having an electrical machine 1 and a controllable energy storage device 2. The electrical machine 1 is represented by way of example as a three-phase electrical machine 1 that is supplied with energy by way of a controllable first energy storage device 2. The controllable first energy storage device 2 comprises three energy supply branches 2a, 2b, 2c that on the one hand are connected by way of connections 4a, 4b, 4c to a reference potential 9 (reference rail), which in the illustrated embodiments leads to a middle potential in relation to phases U, V, W of the electrical machine 1, and on the other hand are connected respectively to the individual phases U, V, W of the electrical machine 1. A connection 3a of a first energy supply branch 2a is coupled to a first phase connection 1a of the electrical machine 1, a connection 3b of a second energy supply branch 2b is coupled to a second phase connection 1b of the electrical machine 1, and a connection 3c of a third energy supply branch 2c is coupled to a third phase connection 1c of the electrical machine 1. Each of the energy supply branches 2a, 2b, 2c comprises series-connected energy storage modules 5a, 6a, and/or 5b, 6b and/or 5c, 6c. By way of example, the number of energy storage modules per energy supply branch 2a, 2b, 2c in FIG. 2 amounts to two, wherein however it is likewise possible to have any other number of energy storage modules.

The energy storage modules 5a, 5b, 5c, 6a, 6b, 6c on the other hand comprise in each case a plurality of series-connection electrical energy storage cells in an energy storage cell device 7. The number of the energy storage cells in an energy storage cell device 7 in FIG. 2 is by way of example 2, wherein however any other number of energy storage cells is likewise possible. The energy storage modules 5a, 5b, 5c, 6a, 6b, 6c comprise in addition in each case a coupling unit 8 that is allocated to the energy storage cells 7 of the respective energy storage module 5a, 5b, 5c, 6a, 6b, 6c. For reasons of clarity, the coupling units and the energy storage cell devices are only provided with reference numerals in the energy storage module 5c. It goes without saying, however, that the energy storage modules 5a, 5b, 6a, 6b, 6c can comprise similar coupling units and energy storage cell devices.

In the illustrated embodiment variants, the coupling units 8 are embodied in each case by four controllable switch elements that are connected in the form of a full bridge. The switch elements can be embodied as semiconductor power switches, for example in the form of IGBTs (insulated gate bipolar transistors) or as MOSFETs (metal oxide semiconductor field-effect transistors). However, it can also be possible to embody the coupling units 8 in each case as a half-bridge arrangement having only in each case two switch elements. Half-bridge arrangements provide the advantage that as a result of the reduced number of switch elements the power losses are reduced, however, they have the disadvantage that the polarity of the voltage cannot be reversed at the output connections 3a, 3b, 3c in the energy supply branches.

In the case of a full-bridge arrangement illustrated by way of example, the coupling units 8 render it possible to interrupt the respective energy supply branch 2a, 2b, 2c by opening all the switch elements of one coupling unit 8. Alternatively, it is possible by closing respectively two of the switch elements of one coupling unit 8 either to bridge the energy storage cells 7 or to connect the energy storage cells 7 to the respective energy supply branch 2a, 2b, 2c.

The total output voltages of the energy supply branches 2a, 2b, 2c are determined by means of the respective switched state of the controllable switch elements of the coupling units 8 and can be adjusted in steps. The stepped adjustment is produced in dependence upon the voltage of the individual energy storage modules 5a, 5b, 5c, 6a, 6b, 6c.

Consequently, the coupling units 8 render it possible to connect the phases U, V, W of the electrical machine 1 either to a high reference potential or a low reference potential and they can in this respect also fulfill the function of a known current converter. It is possible to control the output and mode of operation of the electrical machine 1 by appropriately controlling the coupling units 8 by means of the controllable first energy storage device 2. The controllable first energy storage device 2 therefore fulfills in this respect a dual function, since on the one hand it is used as the electrical energy supply means and on the other hand it is also used to control the electrical machine 1.

The electrical machine 1 comprises stator windings that are mutually connected in a known manner in a star circuit. The electrical machine 1 is embodied in the illustrated exemplary embodiments as a three-phase AC machine but it can also comprise fewer than or more than three phases. The number of the energy supply branches 2a, 2b, 2c in the controllable first energy storage device 2 accordingly depends upon the number of phases of the electrical machine.

Figure 3:
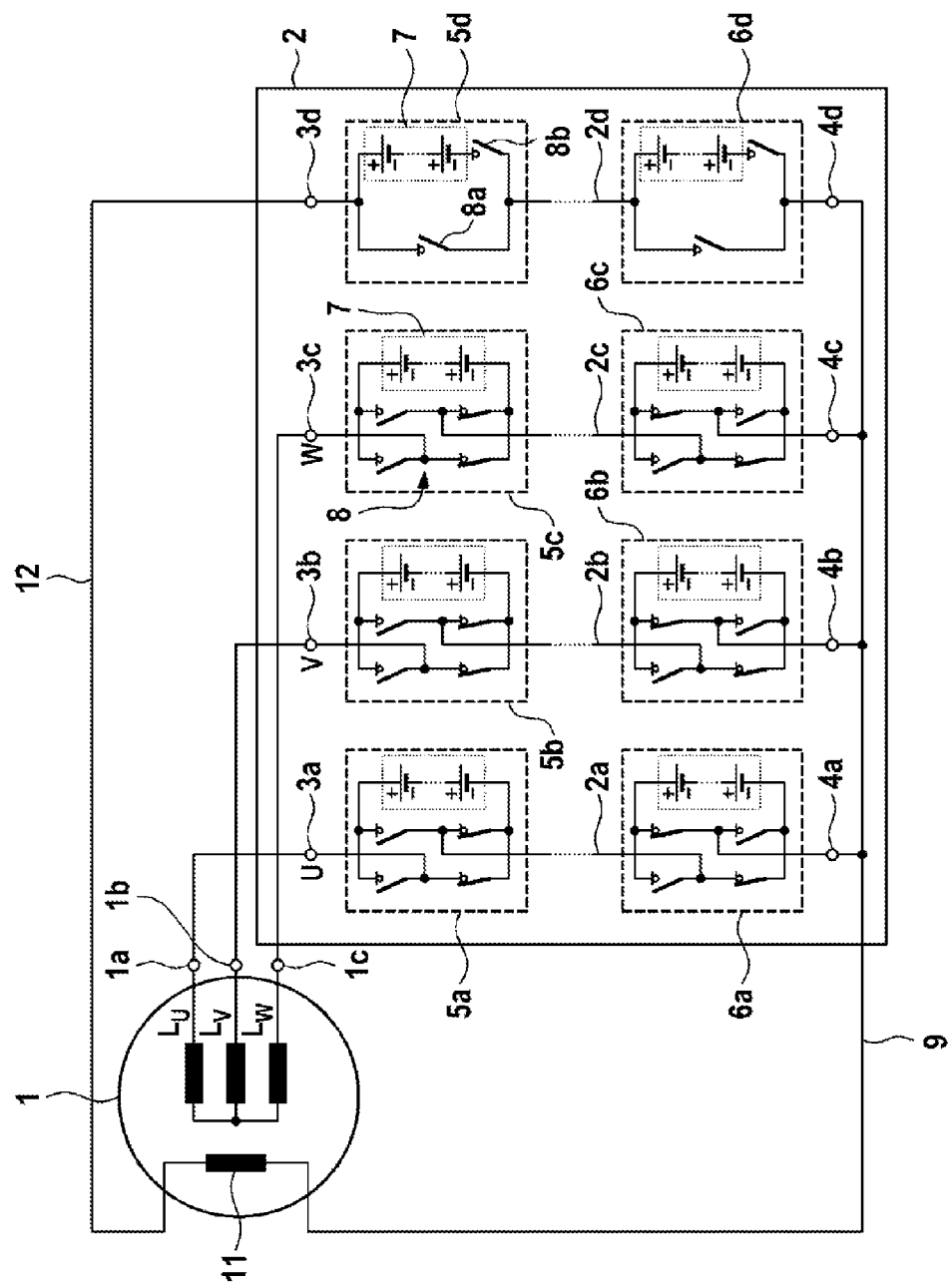
FIG. 3 shows a schematic illustration of a system having a separately excited three-phase synchronous AC machine and a controllable energy storage device in accordance with an embodiment of the present invention.

FIG. 3 shows a schematic illustration of a system having a separately excited three-phase synchronous AC machine 1 and a controllable energy storage device 2 in accordance with an embodiment of the present invention. The system illustrated in FIG. 3 differs from the system illustrated in FIG. 2 merely by virtue of the fact that the electrical machine 1 comprises an exciter winding 11 that is connected by way of a first supply line 12 to a separate energy supply branch 2d of the controllable energy storage device 2, and is connected by way of the reference rail 9 respectively to the connections 4a, 4b, 4c and the connection 4d of the separate energy supply branch 2d of the controllable energy storage device 2.

The separate energy supply branch 2*d* comprises like the energy supply branches 2*a*, 2*b*, 2*c* energy storage modules 5*d*, 6*d* that are allocated series-connected energy storage cells 7 and coupling units 8*a*, 8*b*. In the exemplary embodiment as shown in FIG. 3, the coupling units 8*a*, 8*b* comprise two switch elements in a half-bridge arrangement, which half-bridge arrangement can either bridge the energy storage cells 7 or connect the energy storage cells 7 to the energy supply branch 2*d*.

The separate energy supply branch 2*d* is connected by way of a connection 4*d* to the reference rail 9 of the controllable energy storage device 2 and by way of a connection 3*d* to the exciter winding of the electrical machine 1. With the aid of the separate energy supply branch 2*d*, it is possible to direct a variable current through the exciter winding 11, so that a variable excitation field can be generated in the electrical machine 1.

Although it is not possible in the present exemplary embodiment as shown in FIG. 3 having a half-bridge arrangement of the coupling units 8 to reverse the direction of the current through the exciter winding 11, the power losses at the switch elements of these energy storage modules 5*d*, 6*d* are reduced by virtue of the lower number of necessary switch elements in a half-bridge arrangement of the coupling units 8. Alternatively, the energy storage modules 5*d*, 6*d* of the controllable energy storage device 2 can also be allocated coupling units in a full-bridge arrangement, which coupling units are embodied in a similar manner to the coupling units 8 of the energy storage modules 5*a*, 5*b*, 5*c*, 6*a*, 6*b*, 6*c*. In this case, the direction of the current can be reversed by means of the exciter winding 11 by virtue of correspondingly controlling the coupling units 8.

Figure 4:
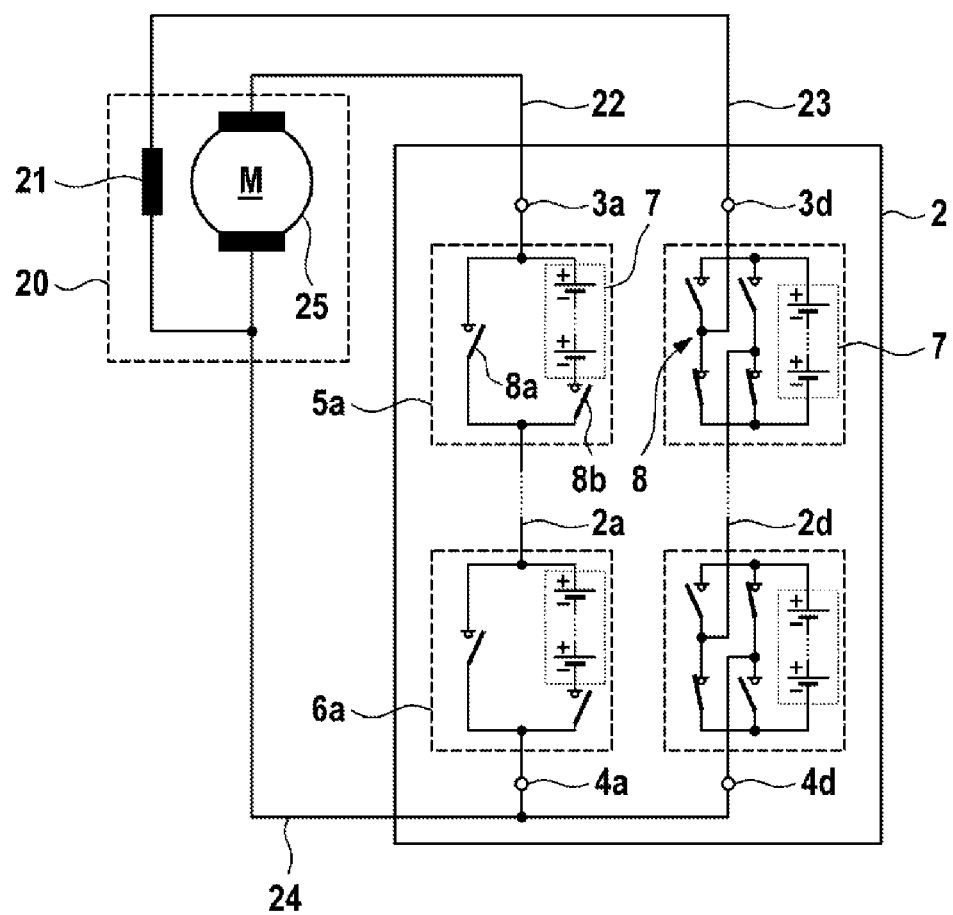
FIG. 4 shows a schematic illustration of a system having a separately excited DC machine and a controllable energy storage device in accordance with a further embodiment of the present invention.

FIG. 4 shows a schematic illustration of a system that has a separately excited DC machine 20 and a controllable energy storage device 2 in accordance with a further embodiment of the present invention. The controllable energy storage device 2 comprises in the exemplary embodiment of FIG. 4 an energy supply branch 2*a* that is allocated two series-connected energy storage modules 5*a*, 6*a*. The energy supply modules 5*a*, 6*a* comprise energy storage cells 7 that are allocated coupling units 8*a*, 8*b*. The coupling units 8*a*, 8*b* of the energy supply modules 5*a*, 6*a* can comprise switch elements in a half-bridge arrangement, as illustrated by way of example in FIG. 4. The controllable energy storage device 2 further comprises a separate energy supply branch 2*d* which is likewise allocated two series-connected energy supply modules 5*d*, 6*d*. The energy supply modules 5*d*, 6*d* comprise energy storage cells 7 that are allocated coupling units 8. The coupling units 8 of the energy supply modules 5*d*, 6*d* are embodied by switch elements in a full-bridge arrangement.

The energy supply branch 2*a* is connected by way of a first connection 3*a* to a connection line 22 of the stator device 25 of the DC machine 20, whereas the energy supply branch 2*d* is connected by way of a second connection 3*d* to a connection line 23 of the exciter winding 21 of the DC machine 20. The DC machine 20 can be supplied with energy by way of the energy supply branch 2*a*. A current for generating an excitation field of the DC machine 20 can be directed by way of the energy supply branch 2*d* through the exciter winding 21.

In the exemplary embodiment shown in FIG. 4, the polarity of the excitation field can be reversed with the aid of a full-bridge arrangement of the coupling units 8 in the energy supply branch 2*d*. As a consequence, it is possible to reverse the direction of rotation of the DC machine 20 without reversing the direction of the current in the stator device 25. Since the current strengths that occur in the energy supply branch 2*a* are usually higher than the current strengths that occur in the energy supply branch 2*a*, it is possible to minimize the power losses, as illustrated in FIG. 4, of the energy supply branch 2*a* using the energy supply modules 5*a*, 6*a* in a half-bridge arrangement. However, it is likewise possible to arrange the coupling units of the energy supply modules 5*a*, 6*a* in a full-bridge arrangement and to arrange the coupling units of the energy supply modules 5*d*, 6*d* in a half-bridge arrangement. The number of the energy supply modules 5*a*, 6*a* and/or 5*d*, 6*d* is likewise not limited to two but rather it can be any user-defined number of energy supply modules per energy supply branch. In particular, it is possible to provide fewer energy supply modules in the energy supply branch 2*d* than in the energy supply branch 2*a*.

The invention claimed is:

1. An energy storage device comprising:
at least a first energy supply branch that is embodied for the purpose of supplying a separately excited electrical machine with energy by way of a first connection; and
a second energy supply branch that is connected in parallel to the at least one first energy supply branch and that is embodied for the purpose of supplying an exciter winding of the separately excited electrical machine with current by way of a second connection,
wherein the at least one first energy supply branch and the second energy supply branch are connected by way of in each case a third connection to the exciter winding.

2. The energy storage device as claimed in claim 1, wherein the at least one first energy supply branch and the second energy supply branch comprise in each case at least two series-connected energy storage modules that comprise in each case at least one electrical energy storage cell having an allocated controllable coupling unit.

3. The energy storage device as claimed in claim 2, wherein the coupling units of the energy storage modules of the at least one first energy supply branch comprise switch elements in a full-bridge arrangement.

4. The energy storage device as claimed in claim 3, wherein the coupling units of the energy storage modules of the second energy supply branch comprise switch elements in a half-bridge arrangement, and wherein the energy storage device is embodied for the purpose of supplying an n-phase synchronous AC machine with energy.

5. The energy storage device as claimed in claim 2, wherein the coupling units of the energy storage modules of the at least one first energy supply branch comprise switch elements in a half-bridge arrangement.

6. The energy storage device as claimed in claim 5, wherein the coupling units of the energy storage modules of the second energy supply branch comprise switch elements in a full-bridge arrangement, and wherein the energy storage device is embodied for the purpose of supplying a separately excited DC machine with energy.

7. The energy storage device as claimed in claim 1, wherein the at least one first energy supply branch and the second energy supply branch are connected by way of in each case the third connection to a common reference rail.

8. A system comprising:
a separately excited electrical machine;
a controllable energy storage device having:
at least one first energy supply branch that is connected by way of a first connection to an energy supply connection of the separately excited electrical machine; and
a second energy supply branch that is connected in parallel to the at least one first energy supply branch and that is connected by way of a second connection to an exciter winding of the separately excited electrical machine, wherein the at least one first energy supply branch and the second energy supply branch are connected by way of in each case a third connection to a common reference rail that is connected to the exciter winding of the separately excited electrical machine.

9. The system as claimed in claim 8, wherein the separately excited electrical machine is an n-phase synchronous AC machine where n>1.

10. The system as claimed in claim 9, wherein the separately excited electrical machine is a separately excited DC machine.

\* \* \* \* \*